United States Patent [19]
Mendez et al.

[11] Patent Number: 5,968,131
[45] Date of Patent: Oct. 19, 1999

[54] SYSTEM AND METHOD FOR SECURELY SYNCHRONIZING MULTIPLE COPIES OF A WORKSPACE ELEMENT IN A NETWORK

[75] Inventors: Daniel J. Mendez, Mountain View; Mark D. Riggins, San Jose; Prasad Wagle, Santa Clara; Christine C. Ying, Foster City, all of Calif.

[73] Assignee: RoamPage, Inc., Mountain View, Calif.

[21] Appl. No.: 09/179,252

[22] Filed: Oct. 26, 1998

Related U.S. Application Data

[63] Continuation of application No. 08/835,997, Apr. 11, 1997.

[51] Int. Cl.$^6$ .................................................. G06F 13/00
[52] U.S. Cl. ..................... 709/246; 709/248; 707/203; 707/201
[58] Field of Search ...................... 395/200.78; 707/203, 707/109, 10, 9, 511, 201; 709/246, 298

[56] References Cited

U.S. PATENT DOCUMENTS

| | | | |
|---|---|---|---|
| 4,831,582 | 5/1989 | Miller et al. | 707/104 |
| 4,875,159 | 10/1989 | Cary et al. | 364/200 |
| 4,897,781 | 1/1990 | Chang et al. | 364/200 |
| 5,263,157 | 11/1993 | Janis | 707/9 |
| 5,386,564 | 1/1995 | Shearer et al. | 395/650 |
| 5,392,390 | 2/1995 | Crozier | 395/161 |
| 5,572,643 | 11/1996 | Judson | 395/793 |

(List continued on next page.)

OTHER PUBLICATIONS

Article by Bellovin et al., entitled: "Network Firewalls," published by IEEE Communications Magazine, Sep. 1994, pp. 50–57.

Article by Steffen Stempel, entitled: "IPAccess—An Internet Service Access System for Firewall Installations," published by IEEE, Feb. 16, 1995, pp. 31–41.

Article by Braun et al., entitled: "Web traffic characterization: an assessment of the impact of caching documents from NCSA's web server," published by Elsevier Science B.V., 1995, pp. 37–51.

Article by Nelson et al., entitled: "Security for Infinite Networks," published by IEEE, Aug. 22, 1995, pp. 11–19.

Article by Greenwald et al., entitled: "Designing an Academic Firewall: Policy, Practice, and Experience with SURF," published by IEEE, Feb. 22, 1996, pp. 79–92.

Article by Kiuchi et al., entitled: "C–HTTP—The Development of a Secure, Closed HTTP–based Network on the Internet," published by IEEE, Feb. 22, 1996, pp. 64–75.

Article by S. Cobb, entitled: "Establishing Firewall Policy," published by National Computer Security Assn., Jun. 25–27, 1996, pp. 198–205.

Marinacci, Enzo, "Bookmark Translator 2.0: This Utility transform Microsoft Internet Explore's bookmarks in the format valid for Netscape Navigator and viceversa." Rome—Jul. 1997, http://www.bns.it/Emware/Bookmark translator–uk, pp. 1–4.

*Primary Examiner*—Mehmet B. Geckil
*Attorney, Agent, or Firm*—Graham & James LLP

[57] ABSTRACT

A system includes a general synchronization module at the client site for operating within a first firewall and for examining first version information to determine whether a first workspace element has been modified. The system further includes a synchronization agent at a global server for operating outside the first firewall and for forwarding to the general synchronization module second version information which indicates whether an independently-modifiable copy of the first workspace element has been modified. A synchronization-start module is maintained at the client site for operating within the first firewall and for securely initiating the general synchronization module and the synchronization agent when predetermined criteria have been satisfied. The system further includes means for generating a preferred version from the first workspace element and from the copy by comparing the first version information and the second version information, and means for storing the preferred version at the first store and at the second store.

49 Claims, 6 Drawing Sheets

U.S. PATENT DOCUMENTS

| | | | |
|---|---|---|---|
| 5,581,749 | 12/1996 | Hossain et al. | 707/1 |
| 5,600,834 | 2/1997 | Howard | 395/617 |
| 5,613,012 | 3/1997 | Hoffman et al. | 382/115 |
| 5,623,601 | 4/1997 | Vu | 395/187.01 |
| 5,627,658 | 5/1997 | Connors et al. | 358/407 |
| 5,634,053 | 5/1997 | Noble et al. | 395/604 |
| 5,647,002 | 7/1997 | Brunson | 380/49 |
| 5,652,884 | 7/1997 | Palevich | 395/651 |
| 5,666,553 | 9/1997 | Crozier | 395/803 |
| 5,678,039 | 10/1997 | Hinks et al. | 395/604 |
| 5,680,542 | 10/1997 | Mulchandani et al. | 395/183.04 |
| 5,682,524 | 10/1997 | Freund et al. | 395/605 |
| 5,684,990 | 11/1997 | Boothby | 395/619 |
| 5,701,423 | 12/1997 | Crozier | 395/335 |
| 5,706,502 | 1/1998 | Foley et al. | 707/10 |
| 5,710,918 | 1/1998 | Lagarde et al. | 395/610 |
| 5,713,019 | 1/1998 | Keaten | 395/610 |
| 5,715,403 | 2/1998 | Stefik | 705/44 |
| 5,717,925 | 2/1998 | Harper et al. | 395/613 |
| 5,721,908 | 2/1998 | Lagarde et al. | 395/610 |
| 5,721,914 | 2/1998 | DeVries | 395/615 |
| 5,729,735 | 3/1998 | Meyering | 395/610 |
| 5,745,360 | 4/1998 | Leone et al. | 364/140 |
| 5,757,916 | 5/1998 | MacDoran et al. | 380/25 |
| 5,758,150 | 5/1998 | Bell et al. | 395/610 |
| 5,758,354 | 5/1998 | Huang et al. | 707/201 |
| 5,758,355 | 5/1998 | Buchanan | 707/201 |
| 5,765,171 | 6/1998 | Gehani et al. | 707/203 |
| 5,778,346 | 7/1998 | Frid-Nielsen et al. | 395/208 |
| 5,790,425 | 8/1998 | Wagle | 364/551.01 |
| 5,790,790 | 8/1998 | Smith et al. | 395/200.36 |
| 5,799,318 | 8/1998 | Cardinal et al. | 707/104 |
| 5,832,483 | 11/1998 | Barker | 707/8 |
| 5,870,759 | 2/1999 | Bauer et al. | 707/201 |

SYSTEM AND METHOD FOR SECURELY SYNCHRONIZING MULTIPLE COPIES OF A WORKSPACE ELEMENT IN A NETWORK

CROSS-REFERENCE TO RELATED APPLICATIONS

This application is a continuation of and incorporates by reference co-pending patent application entitled "System And Method For Securely Synchronizing Multiple Copies Of A Workspace Element In A Network" Ser. No. 08/835, 997, filed on Apr. 11, 1997, by inventors Mendez, Riggins, Wagle and Ying, and is related to co-pending patent application entitled "System and Method for Globally Accessing Computer Services," Ser. No. 08/766,307, filed on Dec. 13, 1996, by inventors Mark D. Riggins, R. Stanley Bailes, Hong Q. Bui, David J. Cowan, Daniel J. Mendez, Mason Ng, Sean Michael Quinlan, Prasad Wagle, Christine C. Ying, Christopher R. Zuleeg and Joanna A. Aptekar-Strober; and to co-pending patent application entitled "System and Method for Enabling Secure Access to Services in a Computer Network," Ser. No. 08/841,950, filed on Apr. 8, 1997, by inventor Mark Riggins, both of which are hereby incorporated by reference. These related applications have been commonly assigned to RoamPage, Inc.

BACKGROUND OF THE INVENTION

1. Field of the Invention

This invention relates generally to computer networks, and more particularly to a system and method for securely synchronizing multiple copies of a workspace element such as a file in a secure network.

2. Description of the Background Art

Data consistency is a significant concern for computer users. For example, when maintaining multiple independently-modifiable copies of a document, a user risks using an outdated version. Further, by the time the user notices the inconsistency, interparty miscommunication or data loss may have resulted. The user must then spend more time attempting to reconcile the inconsistent versions.

The problem of data inconsistency is exacerbated when multiple copies of a document are maintained at different network locations. For example, due to network security systems such as conventional firewall technology, a user may have access only to a particular one of these network locations. Without access to the other sites, the user cannot confirm that the version on the accessible site is the most recent draft.

Therefore, a system and method are needed for providing users with data consistency, and more particularly for synchronizing multiple copies of a workspace element such as a document in the secure network environment.

SUMMARY OF THE INVENTION

The present invention provides a system and method for synchronizing multiple copies of a workspace element in a secure network environment. The secure network environment includes a global server connected to multiple clients. Using the present system and method, the clients automatically synchronize workspace data between multiple sites, independent of whether the sites are protected by site firewalls.

The present system includes a general synchronization module at the client site for operating within a first firewall and for examining first version information to determine whether a first workspace element has been modified. The system further includes a synchronization agent at the global server for operating outside the first firewall and for forwarding to the general synchronization module second version information which indicates whether an independently-modifiable copy of the first workspace element has been modified. A synchronization-start module at the client site operates within the first firewall and initiates the general synchronization module and the synchronization agent when predetermined criteria have been satisfied. The system further includes means for generating a preferred version from the first workspace element and from the copy by comparing the first version information and the second version information, and means for storing the preferred version at the first store and at the second store.

The system further handles the case when both the workspace element and the copy have been modified independently since the last date and time of synchronization. Accordingly, a content-based synchronization module performs a responsive action such as determined a preferred version or storing both the first workspace element and the copy at both the first store and at the second store.

The present method includes the steps of generating first examination results by examining first version information, which indicates whether a first workspace element stored at a first store within a firewall has been modified; and generating second examination results by examining second version information which indicates whether an independently-modifiable copy of the first workspace element, the copy being stored at a second store outside the firewall, has been modified. The present method further includes the steps of initiating synchronization from within the firewall when predetermined criteria have been satisfied; generating a preferred version from the first workspace element and from the copy based on the first and second examination results; and storing the preferred version at the first store and at the second store.

The system and method advantageously use a trusted third party to enable the synchronization of workspace data among multiple sites. Accordingly, a client user who maintains a work site, a home site, an off-site and the global server site can synchronize the workspace data or portions thereof among all four sites. Further, the predetermined criteria (which controls when the synchronization-start module initiates synchronization) may be set so that the general synchronization module synchronizes the workspace data upon user request, at predetermined times during the day such as while the user is commuting, or after a predetermined user action such as user log-off or user log-on. Because the system and method operate over the Internet, synchronization can occur over any distance. Since synchronization is initiated from within the firewall, the typical firewall, which prevents in-bound communications, does not act as an impediment to workspace data synchronization. Also, since the user's preferences may be previously set, the present system and method may operate unattended by the client user.

DETAILED DESCRIPTION OF THE PREFERRED EMBODIMENT

Figure 1:
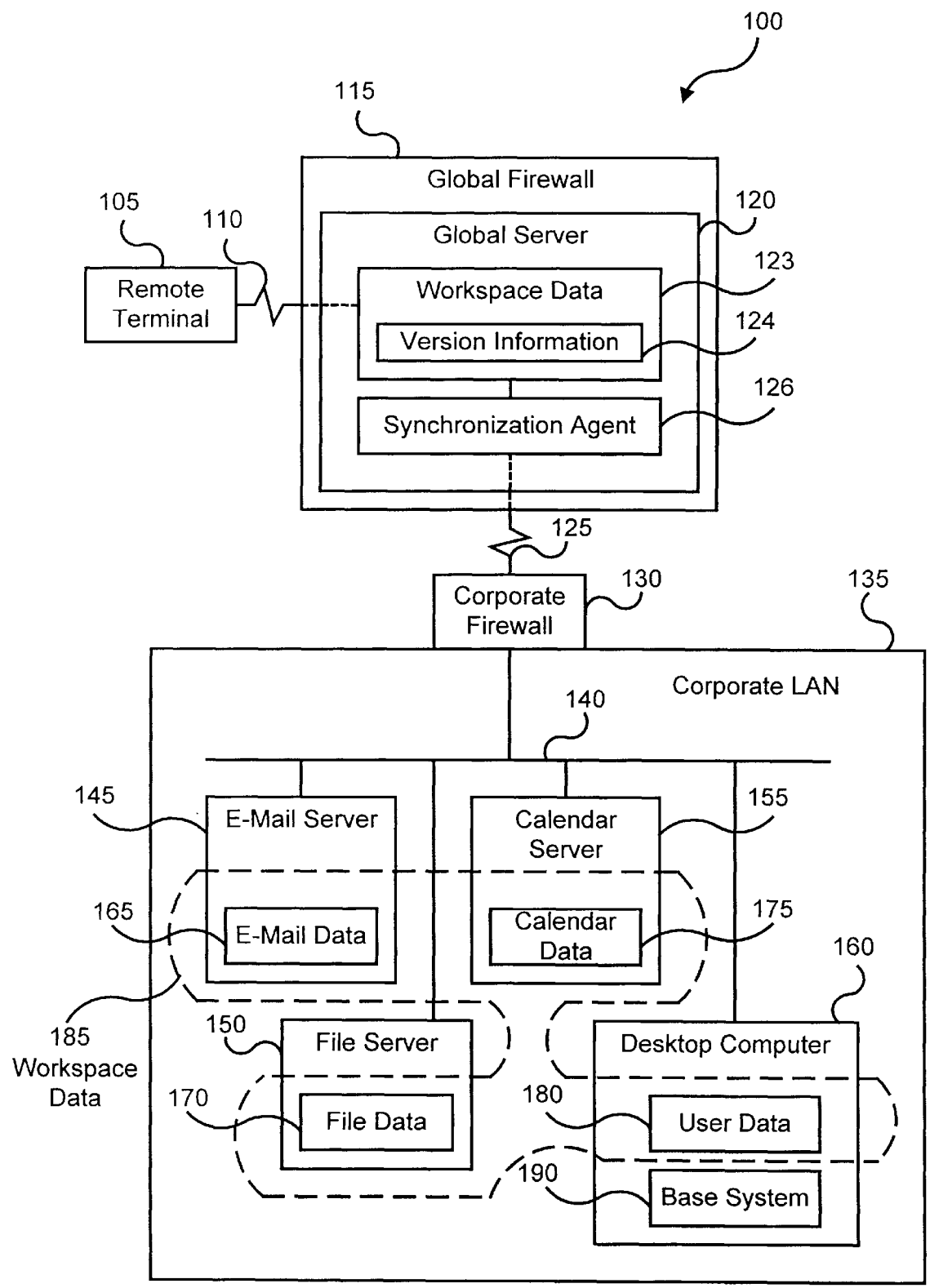
FIG. 1 is a block diagram illustrating a secure data-synchronizing network in accordance with the present invention.

FIG. 1 is a block diagram illustrating a secure data-synchronizing network 100, comprising a first site such as a remote computer terminal 105 coupled via a communications channel 110 such as the Internet to a global server 120. The global server 120 is in turn coupled via a communications channel 125 such as the Internet to a second site such as a corporate Local Area Network (LAN) 135. The global server 120 is protected by a global firewall 115, and the corporate LAN 135 is protected by a corporate firewall 130.

The corporate LAN 135 includes a corporate signal bus 140 coupling the corporate firewall 130 to an e-mail server 145 having e-mail data 165, to a file server 150 having file data 170, to a calendar server 155 having calendar data 175 and to a desktop computer 160 having user data 180. It will be appreciated that the e-mail data 165, file data 170, calendar data 175 and user data 180 or portions thereof may be stored at different locations such as locally on the desktop computer 160. It will be further appreciated that the e-mail data 165, file data 170, calendar data 175 and user data 180 are exemplary and collectively referred to herein as "workspace data" 185. Those skilled in the art will recognize that "workspace data" may include other types of data such as application programs. It will be further appreciated that the e-mail data 165, file data 170, calendar data 175 and user data 180 may each be divided into workspace elements, wherein each workspace element is identified by particular version information 255 (described below with reference to FIG. 2). Accordingly, each e-mail, file, calendar entry, etc. may be referred to as "a workspace element in workspace data."

An independently modifiable copy of the workspace data 185, referred to herein as workspace data 123, is stored on the global server 120 for easy access by a user from the remote terminal 105. Being a copy, the workspace data 123 includes independently modifiable copies of each workspace element in workspace data 185 and an independently modifiable copy of version information 255 (FIG. 2), referred to herein as version information 124.

Network 100 further comprises synchronization means, which includes a base system 190 stored within the corporate LAN 135 and for example on the desktop computer 160 and further includes a synchronization agent 126 stored outside the corporate firewall 130 and preferably on the global server 120. The base system 190 and the synchronization agent 126 cooperate to synchronize the workspace data 185 with the workspace data 123. Generally, the base system 190 manages the workspace data 185 within the corporate LAN 135 and the synchronization agent 126 manages the workspace data 123 within the global server 120. As described in greater detail below with reference to FIG. 4, the base system 190 preferably initiates and controls data synchronization. Other components and functions of the global server 120 are described in the cross-referenced patent applications which are herein incorporated by reference.

The remote terminal 105 may include a smart telephone or a Personal Data Assistant (PDA) such as the PalmPilot system by the U.S. Robotics, Inc. Although not shown, the remote terminal 105 may include a second base system similar to the base system 190, which is described with greater detail with reference to FIG. 4. Accordingly, the second base system on the remote terminal 105 would cooperate with the synchronization agent 126 to synchronize the workspace data stored on the remote terminal 105 with the workspace data 123 stored on the global server 120. As with the corporate LAN, the second base system on the remote terminal 105 would preferably initiate and control data synchronization with the global server 120 for the same reasons discussed below. Workspace data on the remote terminal 105 would thus be synchronized with the workspace data 123 and with the workspace data 185.

Figure 2:
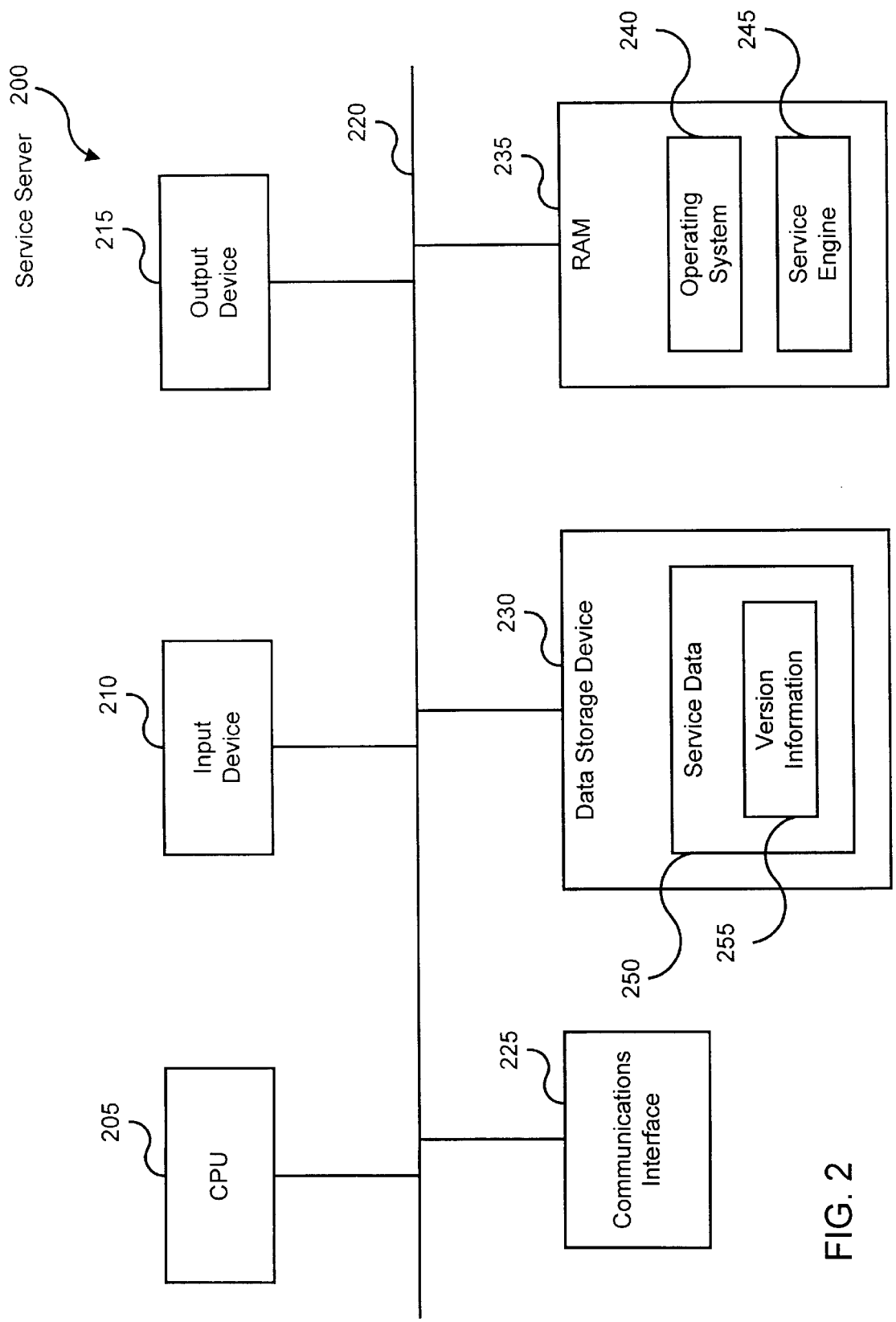
FIG. 2 is a block diagram illustrating details of a FIG. 1 service server.

FIG. 2 is a block diagram illustrating details of a service server 200, wherein each of the e-mail server 145, the file server 150, the calendar server 155 and the desktop computer 160 is an instance thereof. Service server 200 includes a Central Processing Unit (CPU) 205 such as a Motorola Power PC® microprocessor or an Intel Pentium® microprocessor. An input device 210 such as a keyboard and mouse and an output device 215 such as a Cathode Ray Tube (CRT) display are coupled via a signal bus 220 to CPU 205. A communications interface 225 (such as an Ethernet port), a data storage device 230 (such as read only memory or a magnetic disk), and Random-Access Memory (RAM) 235 are further coupled via signal bus 220 to the CPU 205.

An operating system 240 includes a program for controlling processing by the CPU 205, and is typically stored in the data storage device 230 and loaded into the RAM 235 for execution. A service engine 245 includes a program for performing a particular service such as maintaining an e-mail data base, a calendar data base, a bookmarks data base or another file data base, and may be also stored in the data storage device 230 and loaded into the RAM 235 for execution. To perform a service, the service engine 245 operates on service data 250 (e.g., the e-mail data 165, the file data 170, the calendar data 175 or the user data 180), which is typically stored in the data storage device 250. The service data 250 includes version information 255 indicating the date and time of the last modification. The service engine 245 operates to update the version information 255 whenever modifications are made. It will be appreciated that the portion of memory in the data storage device 250 which contains the service data 250 is referred to as the service "store."

Figure 3:
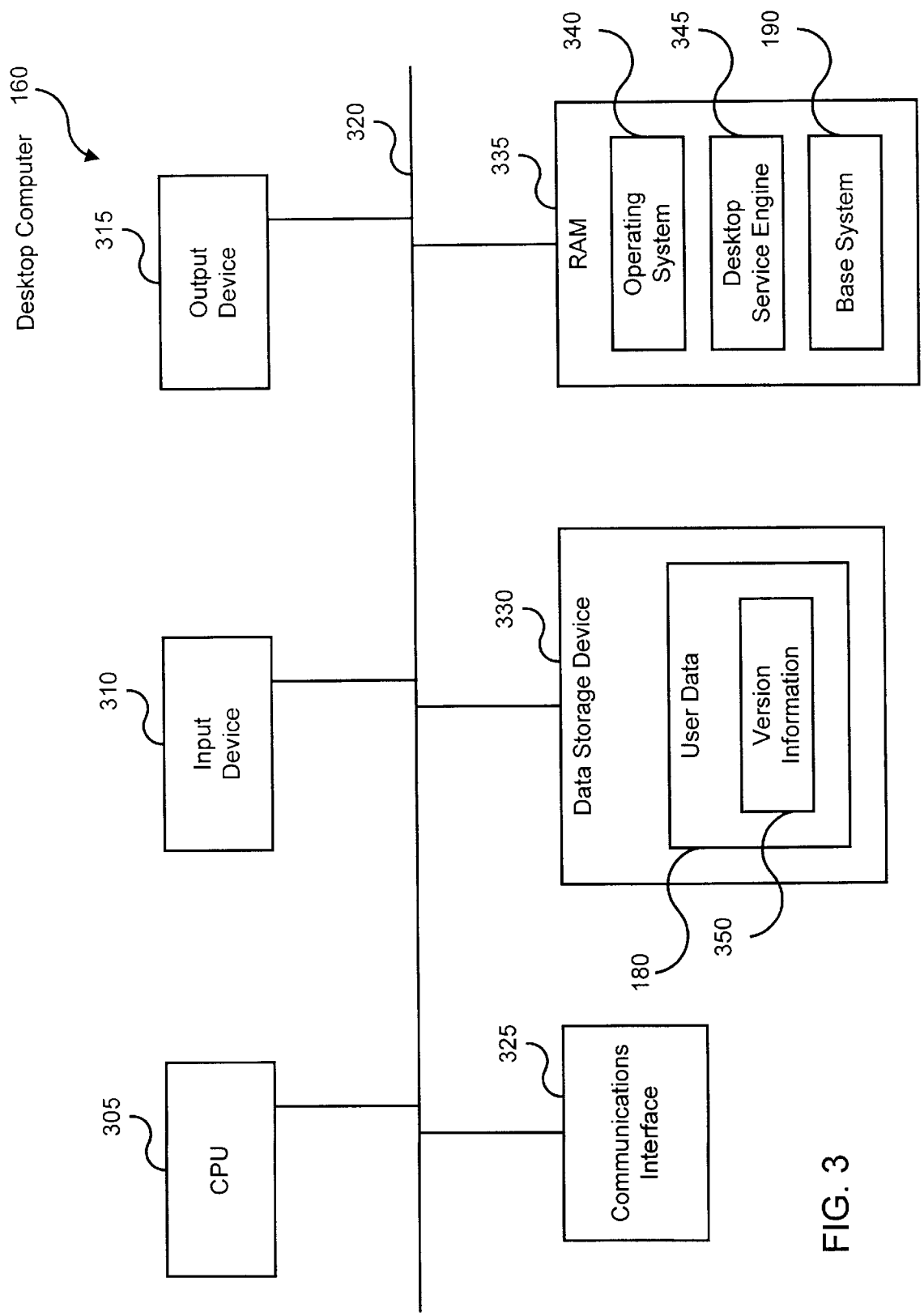
FIG. 3 is a block diagram illustrating details of the FIG. 1 desktop computer.

FIG. 3 is a block diagram illustrating details of the desktop computer 160, which includes a CPU 305, an input device 310, an output device 315, a communications interface 325, a data storage device 330 and RAM 335, each coupled to a signal bus 320.

An operating system 340 includes a program for controlling processing by the CPU 305, and is typically stored in the data storage device 330 and loaded into the RAM 335 for execution. A desktop service engine 345 (i.e., a particular service engine 245, FIG. 2) includes a service program for managing user data 180 (i.e., particular service data 250, FIG. 2) which includes version information 350 (i.e., particular version information 255, FIG. 2). The desktop service engine 345 may be also stored in the data storage device 330 and loaded into the RAM 335 for execution. The user data 180 may be stored in the data storage device 330. As stated above with reference to FIG. 1, the base system 190 operates to synchronize the workspace data 185 (which includes user data 180) with the workspace data 123. The base system 190 may be also stored in the data storage device 330 and loaded into the RAM 335 for execution.

Figure 4:
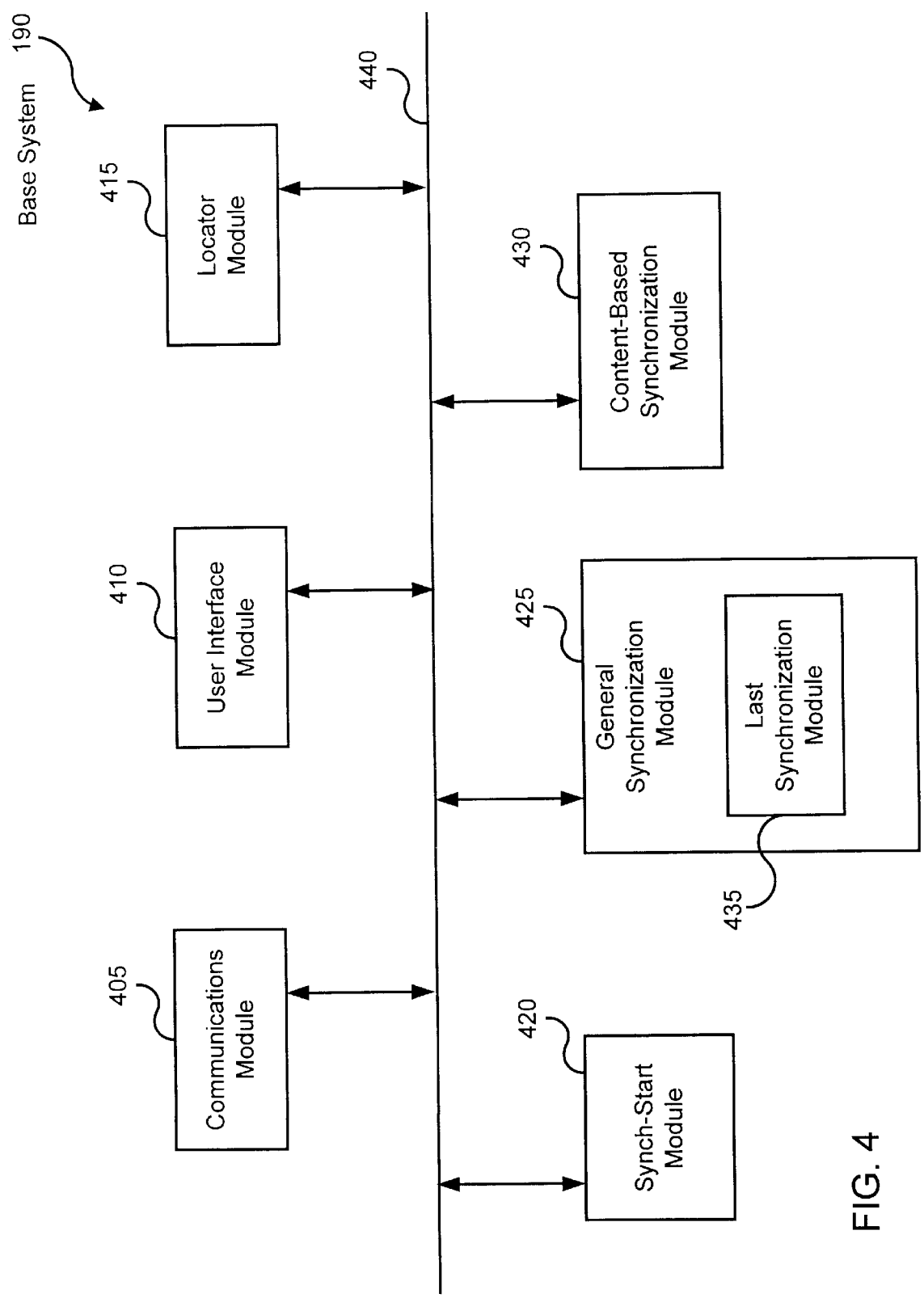
FIG. 4 is a block diagram illustrating details of the FIG. 3 base system.

FIG. 4 is a block diagram illustrating details of the base system 190, which includes a communications module 405, a user interface module 410, a locator module 415, a synchronization-start ("synch-start") module 420, a general synchronization module 425 and a content-based synchronization module 430. For simplicity, each module is illustrated as communicating with one another via a signal bus 440.

The communications module 405 includes routines for compressing data, and routines for communicating via the communications interface 325 (FIG. 3) with the synchronization agent 126 (FIG. 1). The communications module 405 may further include routines for applying Secure Socket Layer (SSL) technology and user identification and authentication techniques (i.e., digital certificates) to establish a secure communication channel through the corporate firewall 130 and through the global firewall 126. Examples of communications modules 405 may include TCP/IP stacks or the AppleTalk® protocol.

The user interface 410 includes routines for communicating with a user, and may include a conventional Graphical User Interface (GUI). The user interface 410 operates in coordination with the other desktop computer 160 components as described herein.

The locator module 415 includes routines for identifying the memory locations of the workspace elements in the workspace data 185 and the memory locations of the workspace elements in the workspace data 123. Workspace element memory location identification may be implemented using intelligent software, i.e., preset memory addresses or the system's registry, or using dialogue boxes to query a user. Accordingly, the locator module 415 determines the memory addresses of the workspace elements in the e-mail data 165, the workspace elements in the file data 170, the workspace elements in the calendar data 175 and the workspace elements in the user data 180 as well as the memory addresses of the corresponding workspace elements in the workspace data 123. It will be appreciated that the locator module 415 may perform workspace element memory location identification upon system boot-up or after each communication with the global server 120 to maintain updated memory locations of workspace elements.

The synchronization-start module 420 includes routines for determining when to initiate synchronization of workspace data 123 and workspace data 185. For example, the synchronization-start module 420 may initiate data synchronization upon user request, at a particular time of day, after a predetermined time period passes, after a predetermined number of changes, after a user action such as user log-off or upon like criteria. The synchronization-start module 420 initiates data synchronization by instructing the general synchronization module 425 to begin execution of its routines. It will be appreciated that communications with synchronization agent 126 preferably initiate from within the corporate LAN 1135, because the typical corporate firewall 130 prevents in-bound communications and allows out-bound communications.

The general synchronization module 425 includes routines for requesting version information 124 from the synchronization agent 126 (FIG. 1) and routines for comparing the version information 255 against a last synchronization signature 435 such as a last synchronization date and time to determine which versions have been modified. The general synchronization module 425 further includes routines for comparing the version information 124 and the version information 255 to determine if only one or both versions of a particular workspace element have been modified and routines for performing an appropriate synchronizing responsive action. Appropriate synchronizing responsive actions may include forwarding the modified version (as the preferred version) of a workspace element in workspace data 185 or forwarding just a compilation of the changes to the other store(s). Other appropriate synchronizing responsive actions may include, if reconciliation between two modified versions is needed, then instructing the content-based synchronization module 430 to execute its routines which are described below.

It will be appreciated that the synchronization agent 126 preferably examines the version information 124 and forwards only the version information 124 determined to be modified since the last synchronization signature 435. This technique makes efficient use of processor power and avoids transferring unnecessary data across the communications channel 125. The general synchronization module 425 in the corporate LAN 135 accordingly compares the received version information 124 with the version information 255 to determine if reconciliation is needed. Upon completion of the data synchronization, the general synchronization module 425 updates the last synchronization signature 435.

The content-based synchronization module 430 includes routines for reconciling two or more modified versions in workspace data 123, 185 of the same workspace element. For example, if the original and the copy of a user workspace element have both been modified independently since the last synchronization, the content-based synchronization module 430 determines the appropriate responsive action. The contentbased synchronization module 430 may request a user to select the preferred one of the modified versions or may respond based on preset preferences, i.e., by storing both versions in both stores or by integrating the changes into a single preferred version which replaces each modified version at both stores.

Figure 5:
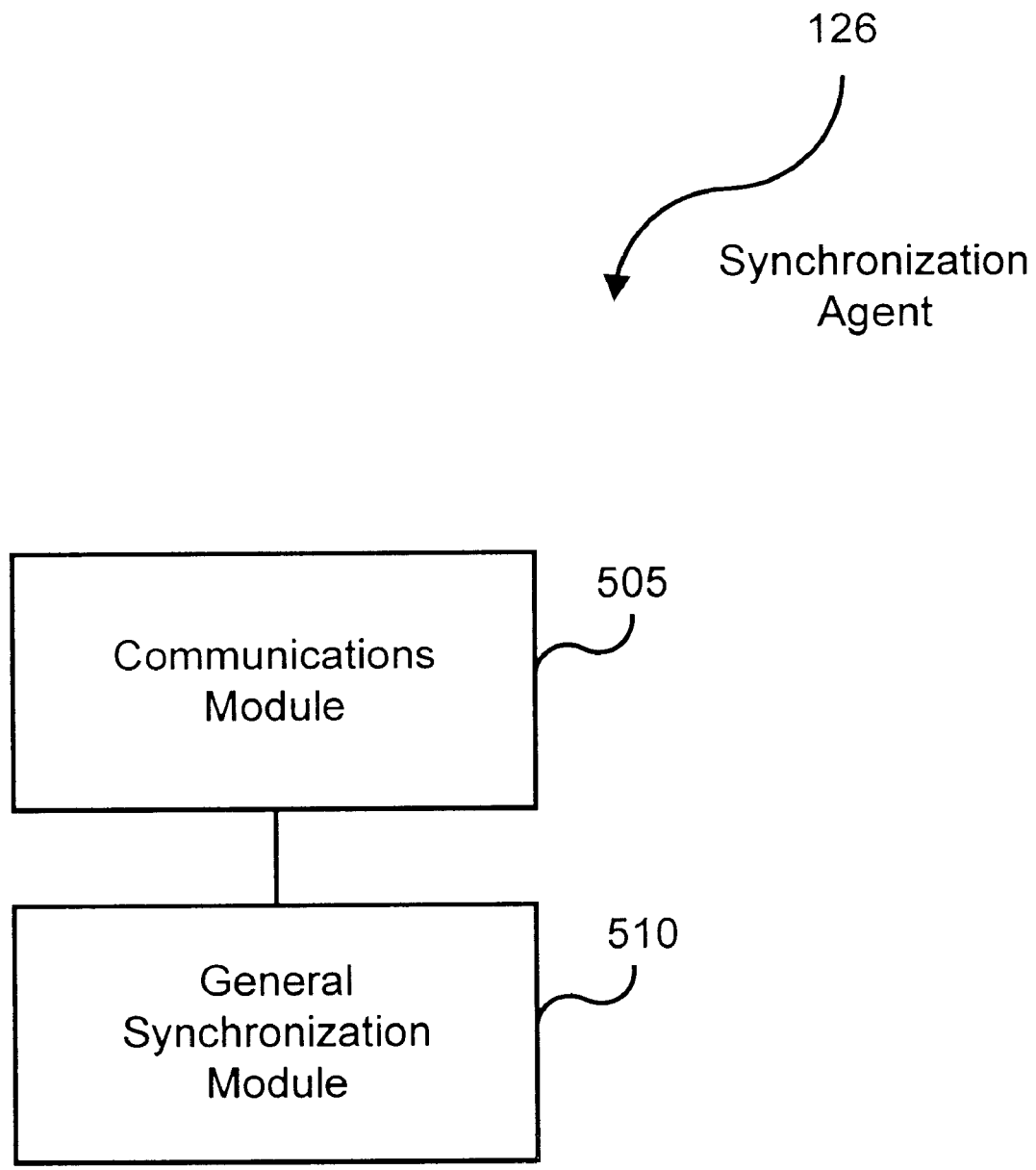
FIG. 5 is a block diagram illustrating details of the FIG. 1 synchronization agent.

FIG. 5 is a block diagram illustrating details of the synchronization agent 126, which includes a communications module 505 (similar to the communications module 405 described above with reference to FIG. 4) and a general synchronization module 510 (similar to the general synchronization module 425 described above also with reference to FIG. 4). The communications module 505 includes routines for compressing data, and routines for communicating via the communications channel 125 with the base system 190. The communications module 505 may further include routines for establishing a secure communications channel through the global firewall 126 and through the corporate firewall 130.

The general synchronization module 510 includes routines for comparing the version information 124 with the last synchronization signature 435, and routines for forwarding to the general synchronization module 425 version information 124 determined to be modified. The general synchronization module 510 may either maintain its own last synchronization signature 435 copy (not shown). Alternatively, the request to synchronize from the base system 190 may include a copy of the last synchronization signature 435. The general synchronization module 510 further includes routines for receiving preferred versions of workspace data 185 workspace elements from the general synchronization module 425, and routines for forwarding preferred versions of workspace data 123 workspace elements to the general synchronization module 425.

Figure 6:
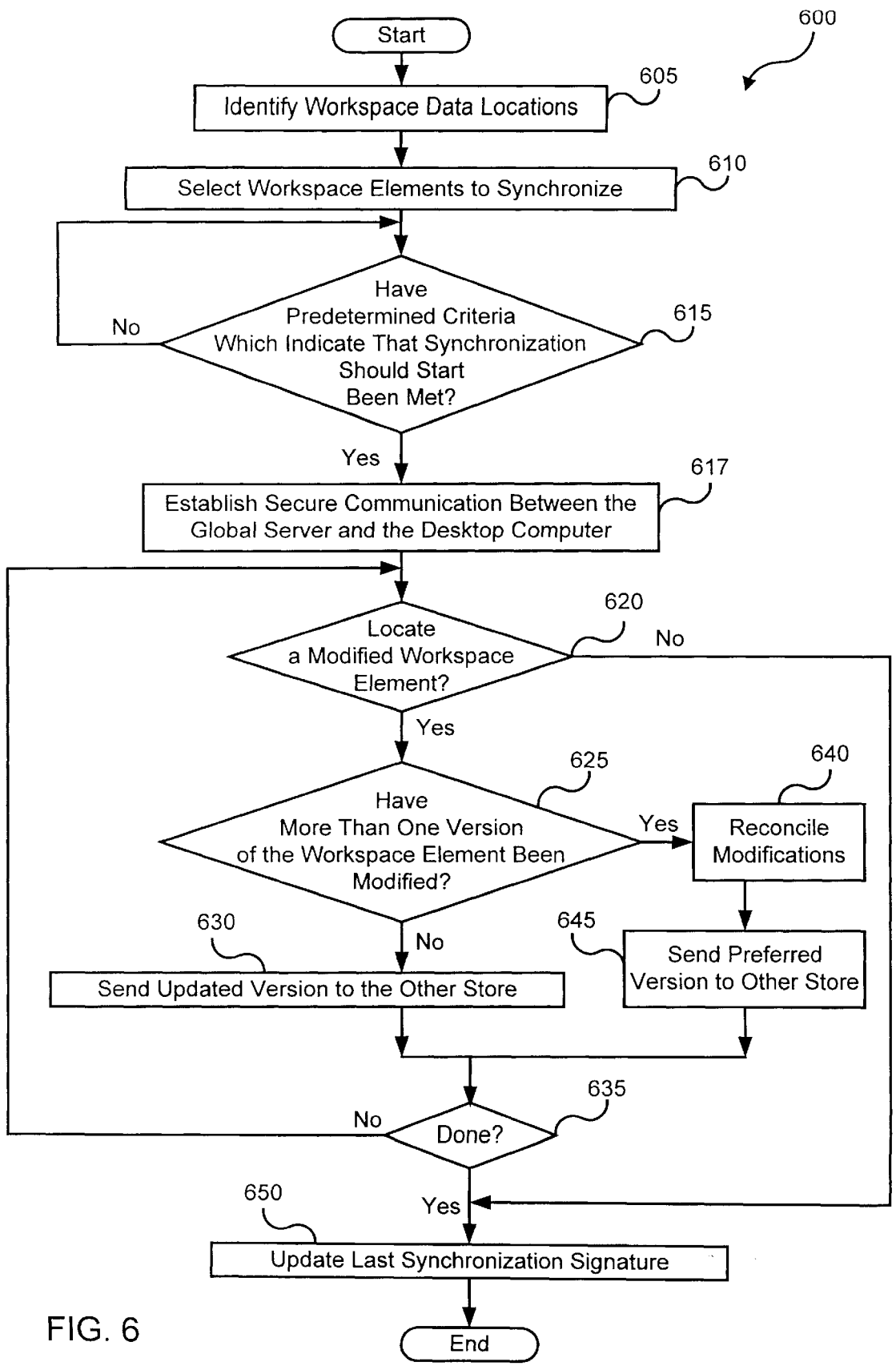
FIG. 6 is a flowchart illustrating a method for synchronizing multiple copies of a workspace element in a secure network.

FIG. 6 is a flowchart illustrating a method 600 for synchronizing multiple copies of workspace data 123, 185 in a secure network 100. Method 600 begins with locator module 415 in step 605 identifying the memory locations of the workspace elements in workspace data 123, 185. As stated above, workspace element memory location identification may be implemented using intelligent software or dialogue boxes. The user interface module 410 in step 610 enables selection of the workspace elements in workspace data 123, 185 to be synchronized by the general synchronization module 425.

The synchronization-start module 420 in step 615 determines whether predetermined criteria have been met which indicate that synchronization of the workspace elements selected in step 610 should start. If not, then method 600 loops back to step 615. Otherwise, the communications module 405 and communications module 505 in step 617 establish a secure communications channel between the global server 120 and the desktop computer 160. The general synchronization module 510 in step 620 compares the version information 124 of each of the selected workspace elements in workspace data 123 against the last synchronization signature 435 to determine modified workspace elements, and forwards the version information 124 of workspace elements determined to be modified to the general synchronization module 425. Further, the general synchronization module 425 in step 620 compares the version information 255 of each selected workspace element in the workspace data 185 against the last synchronization signature 435 to locate modified workspace elements. In this embodiment, a workspace element has been modified if the date and time of last modification is after the date and time of last synchronization.

If no modified workspace elements in workspace data 123 or in workspace data 185 are located, then the general synchronization modules 425 and 510 in step 650 update the last synchronization signature 435 and method 600 ends. Otherwise, the general synchronization module 425 in step 625 determines whether more than one version of the same workspace element has been modified since the last synchronization.

If only one version has been modified, then the corresponding general synchronization module 425 or 510 in step 630 forwards the updated preferred version of the workspace element to the other store, and then in step 635 determines whether all workspace elements selected in step 610 have been examined. If so, then method 600 jumps to step 650. Otherwise, then method 600 returns to step 620.

If more than one version has been modified, then the general synchronization module 425 in step 640 instructs the content-based synchronization module 430 to reconcile the modified versions. Reconciliation may include requesting instructions from the user or, based on preselected preferences, performing responsive actions such as storing both versions at both stores.

General synchronization module 425, 510 in step 645 sends the preferred version of the workspace element or just a compilation of the changes to the other store. That is, if the preferred version is a workspace element in the workspace data 185, then general synchronization module 425 sends the preferred version or the changes to general synchronization module 510 to update the outdated workspace element in the workspace data 123. If the preferred version is a workspace element in the workspace data 123, then the general synchronization module 510 sends the preferred version or the changes to the general synchronization module 425 to update the outdated workspace element in the workspace data 185. Method 600 then jumps to step 635.

The foregoing description of the preferred embodiments of the invention is by way of example only, and other variations of the above-described embodiments and methods are provided by the present invention. For example, although the global server 120 is illustrated as a single device, the global server 120 may include several computers networked together. Although not described in great detail, the remote terminal 105 can synchronize copies of workspace elements stored on it with workspace elements of workspace data 123 stored on the global server 120. Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The system is limited only by the following claims.

What is claimed is:

1. A computer-based method, comprising:
   (a) providing first memory storing a first workspace element and first version information for identifying any modifications made to the first workspace element since a previous examination;
   (b) providing second memory coupled via a network to the first memory, the second memory storing an independently modifiable copy of the first workspace element and second version information for identifying any modifications made to the second workspace element since the previous examination;
   (c) generating from the first version information a first examination result which indicates whether the first workspace element has been modified since the previous examination;
   (d) generating from the second version information a second examination result which indicates whether the copy has been modified since the previous examination;
   (e) initiating steps (c) and (d) after predetermined criteria have been satisfied;
   (f) determining a preferred version based on the first and second examination results and on the first and second version information; and
   (g) storing the preferred version in the first memory and in the second memory.

2. The method of claim 1, wherein the first version information includes a date and time indicating when the first workspace element was last modified.

3. The method of claim 1, wherein the second version information includes a date and time indicating when the second workspace element was last modified.

4. The method of claim 1, wherein step (c) further includes comparing the first version information against a last synchronization signature.

5. The method of claim 4, wherein the last synchronization signature includes a date and time of the previous examination.

6. The method of claim 1, wherein step (d) further includes comparing the second version information against a last synchronization signature.

7. The method of claim 6, wherein the last synchronization signature includes a date and time of the previous examination.

8. The method of claim 1, wherein step (f) includes determining the difference between the first workspace element and the second workspace element.

9. The method of claim 1, wherein, if the first workspace element has been modified and the second workspace element has not been modified, the preferred version is the first workspace element as modified.

10. The method of claim 1, wherein, if the first workspace element has not been modified and the second workspace element has been modified, the preferred version is the second workspace element as modified.

11. The method of claim 1, wherein, if the first workspace element and the second workspace element have been modified, the preferred version includes a version of one of the first or second workspace elements before the previous examination plus any modifications made to the first workspace element as determined from the first version information and any modifications made to the second workspace element as determined from the second version information.

12. The method of claim 1, wherein the preferred version includes a version of one of the first or second workspace elements before the previous examination plus a set of modifications selected from any modifications made to the first workspace element as determined from the first version information and from any modifications made to the second workspace element as determined from the second version information.

13. The method of claim 1, wherein determining whether predetermined criteria have been satisfied includes determining whether a system clock reads a predetermined time of day.

14. The method of claim 1, wherein determining whether predetermined criteria have been satisfied includes recognizing a particular computer event.

15. The method of claim 1, wherein determining whether predetermined criteria have been satisfied includes recognizing a predetermined number of modifications to a workspace element.

16. A system, comprising:
   (a) first memory for storing first workspace elements and first version information for identifying any modifications to the first workspace elements since a previous examination;
   (b) second memory coupled via a network to the first memory for storing independently modifiable copies of the first workspace elements and second version information for identifying any modifications to the copies since the previous examination;
   (c) a general synchronization module for generating from the first version information first examination results, which indicate which first workspace elements have been modified since the previous examination;
   (d) a synchronization agent for sending at least a portion of the second version information to the general synchronization module, so that the general synchronization module can obtain second examination results which indicate which copies have been modified since the previous examination;
   (e) a synchronization-start module for initiating the general synchronization module and the synchronization agent after predetermined criteria have been satisfied;
   (f) means for determining preferred versions based on the first and second examination results; and
   (g) means for storing the preferred versions at the first store and at the second store.

17. The system of claim 16, wherein the first version information includes a date and time indicating when each first workspace element was last modified.

18. The system of claim 16, wherein the second version information includes a date and time indicating when each second workspace element was last modified.

19. The system of claim 16, wherein the general synchronization module compares the first version information against a last synchronization signature.

20. The system of claim 17, wherein the last synchronization signature includes a date and time of the previous examination.

21. The system of claim 16, wherein the means for generating preferred versions determines the difference between each first workspace element and the corresponding copy.

22. The system of claim 16, wherein the portion of the second version information includes all the second version information, and wherein the general synchronization module generates the second examination results to determine which copies have been modified.

23. The system of claim 9, wherein the synchronization agent determines which copies have been modified, and wherein the portion includes the second version information corresponding to the modified copies.

24. The system of claim 16, wherein, if the first workspace element has been modified and the second workspace element has not been modified, the preferred version is the first workspace element as modified.

25. The system of claim 16, wherein, if the first workspace element has not been modified and the second workspace element has been modified, the preferred version is the second workspace element as modified.

26. The system of claim 16, wherein, if the first workspace element and the second workspace element have been modified, the preferred version includes a version of one of the first or second workspace elements before the previous examination plus any modifications made to the first workspace element as determined from the first version information and any modifications made to the second workspace element as determined from the second version information.

27. The system of claim 16, wherein the preferred version includes a version of one of the first or second workspace elements before the previous examination plus a set of modifications selected from any modifications made to the first workspace element as determined from the first version information and from any modifications made to the second workspace element as determined from the second version information.

28. The system of claim 16, wherein the means for determining determines whether a system clock reads a predetermined time of day.

29. The system of claim 16, wherein the means for determining determines whether a particular computer event occurred.

30. The system of claim 16, wherein the means for determining determines whether a predetermined number of modifications to a workspace element occurred.

31. A computer-based method, comprising:
   (a) providing first memory storing a first workspace element and first version information for identifying any modifications to the first workspace element since a previous examination;
   (b) providing second memory coupled via a network to the first memory, the second memory storing an independently modifiable copy of the first workspace element and second version information for identifying and modifications to the second workspace element since the previous examination;
   (c) waiting until predetermined criteria have been satisfied;
   (d) generating from the first version information a first examination result which indicates whether the first workspace element has been modified since the previous examination;

(e) receiving data related to the second version information from the second store;

(f) determining a preferred version based on the first examination result and on the received portion; and (g) storing the preferred version in the first memory and in the second memory.

32. The method of claim 31, wherein the data includes the second version information if the copy has been modified since the previous examination.

33. The method of claim 32, wherein the data includes the second version information, and further comprising the step of generating from the second version information a second examination result indicating whether the copy has been modified since the previous examination.

34. The method of claim 33, wherein the data includes an indication that the copy has not been modified.

35. The system of claim 31, wherein, if the first workspace element has been modified and the second workspace element has not been modified, the preferred version is the first workspace element as modified.

36. The system of claim 31, wherein, if the first workspace element has not been modified and the second workspace element has been modified, the preferred version is the second workspace element as modified.

37. The system of claim 31, wherein, if the first workspace element and the second workspace element have been modified, the preferred version includes a version of one of the first or second workspace elements before the previous examination plus any modifications made to the first workspace element as determined from the first version information and any modifications made to the second workspace element as determined from the second version information.

38. The system of claim 31, wherein the preferred version includes a version of one of the first or second workspace elements before the previous examination plus a set of modifications selected from any modifications made to the first workspace element as determined from the first version information and from any modifications made to the second workspace element as determined from the second version information.

39. The system of claim 31, wherein the means for determining determines whether a system clock reads a predetermined time of day.

40. The system of claim 31, wherein the means for determining determines whether a particular computer event occurred.

41. The system of claim 31, wherein the means for determining determines whether a predetermined number of modifications to a workspace element occurred.

42. A computer-readable storage medium storing program code for causing a computer to perform the steps of:

(a) receiving a start signal after predetermined criteria have been satisfied;

(b) retrieving first version information identifying any modifications to a first workspace element since a previous examination from first memory;

(c) requesting, from second memory which is coupled via a network to the first memory and which stores an independently modifiable copy of the first workspace element, copy information identifying any modifications to the copy since the previous examination;

(d) generating, from the first version information, a first examination result which indicates whether the first workspace element has been modified since the previous examination;

(e) determining a preferred version based on the first examination result, on the first version information and on the copy information; and (f) storing the preferred version in the first memory and in the second memory.

43. The computer-readable storage medium of claim 42 further storing program code for causing the computer to perform the step of: wherein, if the first workspace element has been modified and the second workspace element has not been modified, the preferred version is the first workspace element as modified.

44. The computer-readable storage medium of claim 42 further storing program code for causing the computer to perform the step of: wherein, if the first workspace element has not been modified and the second workspace element has been modified, the preferred version is the second workspace element as modified.

45. The computer-readable storage medium of claim 42 further storing program code for causing the computer to perform the step of: wherein, if the first workspace element and the second workspace element have been modified, the preferred version includes a version of one of the first or second workspace elements before the previous examination plus any modifications made to the first workspace element as determined from the first version information and any modifications made to the second workspace element as determined from the second version information.

46. The computer-readable storage medium of claim 42 further storing program code for causing the computer to perform the step of: wherein the preferred version includes a version of one of the first or second workspace elements before the previous examination plus a set of modifications selected from any modifications made to the first workspace element as determined from the first version information and from any modifications made to the second workspace element as determined from the second version information.

47. The computer-readable storage medium of claim 42 further storing program code for causing the computer to perform the step of: wherein determining whether predetermined criteria have been satisfied includes determining whether a system clock reads a predetermined time of day.

48. The computer-readable storage medium of claim 42 further storing program code for causing the computer to perform the step of: wherein determining whether predetermined criteria have been satisfied includes recognizing a particular computer event.

49. The computer-readable storage medium of claim 42 further storing program code for causing the computer to perform the step of: wherein determining whether predetermined criteria have been satisfied includes recognizing a predetermined number of modifications to a workspace element.

* * * * *

UNITED STATES PATENT AND TRADEMARK OFFICE
CERTIFICATE OF CORRECTION

PATENT NO. : 5,968,131

DATED : October 19, 1999

INVENTOR(S) : Daniel J. Mendez et al.

It is certified that error appears in the above-identified patent and that said Letters Patent is hereby corrected as shown below:

Column 10, line 16, "claim 9" should read --claim 16--
Column 10, line 62, "and modifications" should read --any modifications--

Signed and Sealed this

Twenty-fifth Day of April, 2000

Attest:

Q. TODD DICKINSON

*Attesting Officer*                    *Director of Patents and Trademarks*

US005968131C1

(12) EX PARTE REEXAMINATION CERTIFICATE (6886th)
United States Patent
Mendez et al.

(10) Number: US 5,968,131 C1
(45) Certificate Issued: Jun. 23, 2009

(54) SYSTEM AND METHOD FOR SECURELY SYNCHRONIZING MULTIPLE COPIES OF A WORKSPACE ELEMENT IN A NETWORK

(75) Inventors: Daniel J. Mendez, Mountain View, CA (US); Mark D. Riggins, San Jose, CA (US); Prasad Wagle, Santa Clara, CA (US); Christine C. Ying, Foster City, CA (US)

(73) Assignee: Visto Corporation, Redwood Shores, CA (US)

Reexamination Request:
No. 90/010,242, Aug. 11, 2008
No. 90/010,259, Aug. 28, 2008

Reexamination Certificate for:
Patent No.: 5,968,131
Issued: Oct. 19, 1999
Appl. No.: 09/179,252
Filed: Oct. 26, 1998

Certificate of Correction issued Apr. 25, 2000.

Related U.S. Application Data

(63) Continuation of application No. 08/835,997, filed on Apr. 11, 1997, now Pat. No. 6,085,192.

(51) Int. Cl.
*G06Q 10/00* (2006.01)
*H04L 29/06* (2006.01)
*H04L 12/58* (2006.01)

(52) U.S. Cl. .................... 709/246; 707/201; 707/203; 709/248

(58) Field of Classification Search .................. None
See application file for complete search history.

(56) References Cited

U.S. PATENT DOCUMENTS 5,727,202 A 3/1998 KuKale
6,006,274 A 12/1999 Hawkins

OTHER PUBLICATIONS

Kevin Brown, et al., "Mastering Lotus Notes" 1995, Sybex Incorporated.
"Lotus Notes Release 4.5 Administrator's Guide" 1996 Lotus Development Corporation, Cambridge MA.
Berners–Lee, et al, Request for Comment 1945, Hypertext Transfer Protocol—HTTP/1.0, May 1996.
Motorola "AirMobile Wireless Software for Lotus cc: Mail Communication Client Guide" 1995.
John P. Lamb, et al "Lotus Notes Network Design," 1996 McGraw–Hill.
"Lotus Notes Release 4 Deployment Guide" 1995 Lotus Development Corporation, Cambridge MA.
"Lotus Notes Release 4 Administrator's Guide" 1996 Lotus Development Corporation, Cambridge, MA.
Vin Colella "Playing with Firewalls," IBM, Mar. 10, 1997.
Vin Colella "Special Report: Notes and the Internet" Technical Journal for Lotus Notes Software: The View, Oct. 1996.
Anupam Joshi, et al "Mowser: Mobile Platforms and Web Browsers," University of Purdue.

*Primary Examiner*—Ovidio Escalante

(57) ABSTRACT

A system includes a general synchronization module at the client site for operating within a first firewall and for examining first version information to determine whether a first workspace element has been modified. The system further includes a synchronization agent at a global server for operating outside the first firewall and for forwarding to the general synchronization module second version information which indicates whether an independently-modifiable copy of the first workspace element has been modified. A synchronization-start module is maintained at the client site for operating within the first firewall and for securely initiating the general synchronization module and the synchronization agent when predetermined criteria have been satisfied. The system further includes means for generating a preferred version from the first workspace element and from the copy by comparing the first version information and the second version information, and means for storing the preferred version at the first store and at the second store.

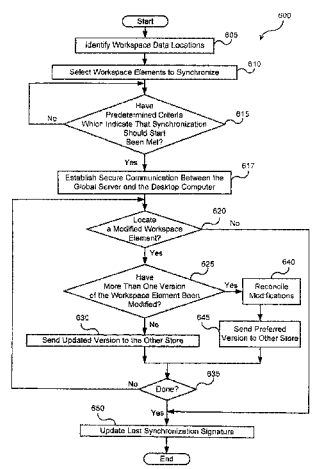

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–49 are cancelled.

* * * * *